April 10, 1956     D. R. DEWEY II, ET AL     2,741,591

METHOD OF AND APPARATUS FOR SEPARATING IONS

Filed March 2, 1951     2 Sheets-Sheet 1

INVENTOR.
DAVIS R. DEWEY, II
EDWIN R. GILLILAND
BY

ATTORNEYS

April 10, 1956     D. R. DEWEY II, ET AL     2,741,591
METHOD OF AND APPARATUS FOR SEPARATING IONS
Filed March 2, 1951     2 Sheets-Sheet 2
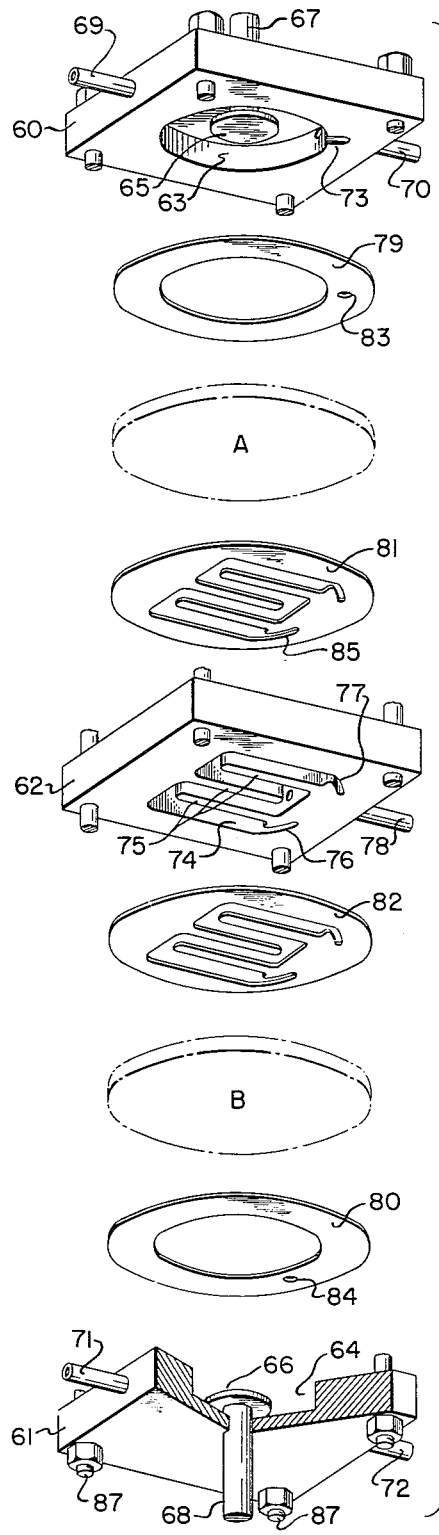
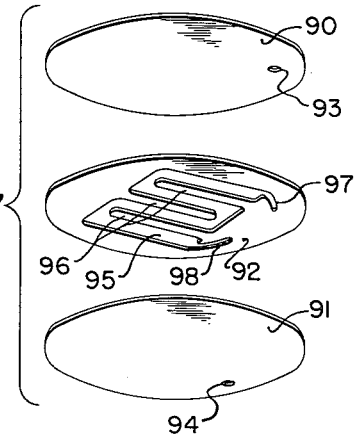
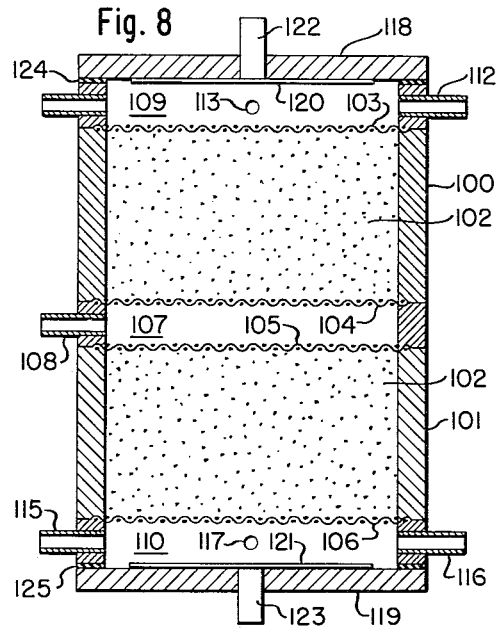
INVENTOR.
DAVIS R. DEWEY, II
EDWIN R. GILLILAND
BY
ATTORNEYS

United States Patent Office 2,741,591
Patented Apr. 10, 1956

2,741,591

METHOD OF AND APPARATUS FOR SEPARATING IONS

Davis R. Dewey II, Cambridge, and Edwin R. Gilliland, Arlington, Mass., assignors to Ionics, Incorporated, Cambridge, Mass., a corporation of Massachusetts Application March 2, 1951, Serial No. 213,514

15 Claims. (Cl. 204—180)

This invention relates to ionic migration phenomena and comprises a process of and apparatus for separating ions which are of like charge.

The processes which have heretofore been used to separate ionic species have generally been based on the differences in such physical properties as solubility, vapor pressure, density, melting point and the like of materials containing the ions. Such separation processes have necessitated the conversion of the ions into intermediate forms, such as salts, which exhibit differences in one or more of such properties which may be utilized in effecting a separation. This invention provides an efficient process of separating ions of like charge which may be used to recover or remove any one or more of the species of ions present in a mixture without converting the ions to intermediate forms for the purposes of separation. The process of this invention only requires that the ions be present in a solution in which they will migrate when subjected to an electric field.

The process of this invention is based on the partial separation of different species of ions of like charge which is effected when those species are caused to pass by means of an applied electric potential from one electrolytic solution region into a second electrolytic solution region through an ion-permeable partition. If two electrolytic solutions are separated by an ion permeable partition and a potential is applied to effect the passage of an electric current in series through the solutions and partition, ions are transferred from one solution to the other. Anions tend to migrate into the anodic solution and cations tend to migrate in the opposite direction. If more than one ionic species of one charge (anions or cations) are transferred across the partition, from a donor solution to a donee solution, the relative amount of each species entering the donee solution generally differs from its relative concentration in the donor solution. A partial separation is thereby effected, the donee solution being relatively enriched with respect to one or more species relative to the other species. For any particular system a separation factor, $\alpha$, may be determined which expresses the degree to which one species is separated from any or all other species. If the species present be designated A, B, C, etc.; the amount of each species of one charge transferred (expressed as a fraction of the total number of equivalents of ions of one charge transferred) be designated $y_A$, $y_B$, $y_C$, etc. (so that $y_A + y_B + y_C + \ldots = 1$); and the relative concentration of each species of one charge in the donor solution (expressed as a fraction of the total number of equivalents of ions of one charge in the donor solution) be designated $x_A$, $x_B$, $x_C$, etc. (so that $x_A + x_B + x_C \ldots = 1$) the separation factor of species A relative to species B is:

$$\alpha AB = \frac{y_A}{y_B} \bigg/ \frac{x_A}{x_B}$$

In a two component system the separation factor of species A may be represented as $$\alpha A = \frac{y_A}{1-y_A} \bigg/ \frac{x_A}{1-x_A}$$

Inasmuch as the transfer of ions across the partition from one solution to another constitutes the passage of an electric current, the separation phenomenon of this invention may be analyzed in terms of the fraction of the ionic current due to the transfer of all species of one charge carried by each species of that charge. That fraction is referred to herein as the relative transport number, $t$, of a given species. (The transport number represents the fraction of the total current due to the transfer of ions of both charges carried by each species. Relative transport number, on the other hand, is concerned only with the current carried by ions of one charge). The relative amounts of each species (expressed in terms of equivalents) traversing a partition from a donor solution to a donee solution may, accordingly, be expressed by its relative transport number in the particular system under consideration. The ratio of this relative transport number of a species to its concentration (expressed as a fraction of the total number of equivalents of ions of one charge) in the donor solution indicates the relative enrichment of the donee solution with respect to that species. Comparing any two species of ions, the donee solution can be said to be relatively enriched in that species having the higher relative transport number-to-concentration ratio. This ratio is referred to hereafter as the transport mobility.[1]

Since the amount of each species transferred, expressed as a fraction of the total number of equivalents transferred, $y$ is numerically equal to the relative transport number of that species, the separation factor $\alpha$ is numerically equal to the ratio of transport mobilities, that is:

$$\alpha AB = \frac{y_A}{y_B} \bigg/ \frac{x_A}{x_B} = \frac{t_A}{x_A} \bigg/ \frac{t_B}{x_B}$$

where $t_A$ represents the relative transport number of species $A (=y_A)$ and $t_B$ represents the relative transport number of species $B (=y_A)$.

It will be seen that a requisite for separation of different species of ions of one charge is a difference in their transport mobilities, or, in other words, a separation factor which does not equal unity. It should be understood that relative transport number, transport mobility and separation factors are properties of particular systems and of the ions when in them, and are not properties inherent in the ions themselves. It has been found that the nature and degree of separation attainable in a system depends in part and varies with the particular material comprising the partition, the relative and absolute concentrations of the ionic species under consideration and also on the concentrations and nature of other matter present in the solutions. Accordingly, the transport numbers, transport mobilities and separation factors are necessarily influenced by the same factors. An appreciation of these operating properties facilitates the practice of the process of this invention by making it possible to design and operate equipment according to the requirements of the particular system of interest, and to select partitions which are differentially permeable to the species of ions which are to be separated.

Several species of ions present in a solution may be partially separated by causing these species to migrate across a partition of ion permeable material into a donee

---

[1] Transport mobility, as the term is used herein, is not to be confused with ionic mobility which is merely an expression of the rate at which an ion travels through a solution under the influence of an electric field. It is generally expressed in terms of cm./sec. volt. Transport mobility expresses the relative rate at which an ion travels from one solution region to another through a solid region, and it is dimensionless.

solution and removing successive fractions of the donee solution. Each successive fraction becomes leaner in any species relative to other species having lower transport mobilities. A variation of this process effects continuous separation by providing for continuous flow of one or both solutions past the partition. Where a greater degree of separation than can be thus accomplished is desired the separation processes may be repeated.

In preferred embodiments of the present invention the separation process fundamentally comprises the steps of causing the ionic species which are to be separated to permeate a partition or region of ion-permeable solid material from one electrolytic solution region to another, as explained above, while causing solution to flow in the opposite direction, that is from the latter solution region (referred to herein as the donee region) to the former solution region (referred to herein as the donor region). The countercurrent flow of solution comprises a reflux which enhances the degree of separation attainable. Where a greater degree of separation is desired than can be effected by the single stage process just described, there may be provided continuously a succession of such separations by causing the ionic species of like charge to migrate progressively through a succession of solid ion-permeable partitions or regions, while maintaining a flow of reflux in a direction opposing that of the ionic migration. Regions hydraulically upstream thereby become progressively enriched in each species of ions relative to each other species having a lower transport mobility, and regions hydraulically downstream become progressively enriched in each species of ion relative to each other species having a higher transport mobility. The degree of separation may be varied within limits by changing the flow of reflux and current. The reflux may be caused to flow in perfect hydraulic series from each donee region to the corresponding donor region, or it may be caused to flow in a composite direction opposite that of ionic migration whereby the net flow opposes the ionic migration.

The solid ion-permeable regions or partitions may comprise spaced membranes defining between them liquid-containing regions, or they may comprise randomly or systematically spaced masses of solid ion-permeable material, such as blocks, beads, granules, balls, saddles and other forms of packing, the masses being substantially surrounded with liquid in such a manner that the ions to be separated can traverse many alternating solid and liquid regions while the liquid flows in a composite direction opposite that of the ionic migration. The flow of ions in either case is effected by conducting an electric current through the liquid and solid regions.

Ion permeable solids, suitable in this invention, may comprise any differentially permeable solid or rigid material which conducts electricity by the transfer of ions through it and which is also sufficiently hydraulically impermeable so that the ionic flow through it is not disturbed by hydraulic flow through it. The electrical conductivity of the solid is desirably as high as possible preferably in excess of $10^{-3}$ ohm$^{-1}$ cm.$^{-1}$ (the conductivity, expressed in reciprocal ohms, of a centimeter cube of the material) in order to minimize power losses. Materials having a hydraulic resistivity greater than $10^3$ atm. sec. cm.$^{-2}$ (the pressure in atmospheres required to effect a passage of 1 cubic centimeter per second of liquid through a centimeter cube of the material) are generally sufficiently impermeable to liquids to be used satisfactorily in this invention.

It will be seen that there are potentially a great number of materials having these characteristics and which may therefor be useful in this invention. A few examples of such materials which have been found particularly useful are solvated indispersible gels such as insoluble polyvinyl alcohol, gels,[2] and regenerated cellulose gels,[3] which contain diffused in them ionized salts and are thereby rendered conductive. Such gels may be formed into membranes and used as such, or they may be formed into beads, granules or the like and used as a packing material provided they are not compactible.

Another group of compounds having the requisite properties of high conductivity (ionic permeability) and high hydraulic resistivity are the commercial ion exchange resins, that is, synthetic organic polymeric resins having immobile dissociable ion-exchange groups fixed in their polymeric structure and mobile replaceable ions associated therewith and electrostatically retained within the polymeric structure. Such resins are at present obtainable only in granular form which limits them to use as a packing material.

Continuous homogeneous ion-exchange gels comprise a third group of materials having high ionic permeability and high hydraulic resistivity. These gels have a solid phase consisting of a synthetic organic polymer including dissociable ion exchange groups and mobile replaceable ions associated with them. They are highly conductive and may be formed into mechanically stable membranes, rods, tubes, balls, blocks, and other large dimensional structures as well as into beads or granules. They are described in the copending application of Walter Juda and Wayne A. McRae, Ser. No. 103,784 filed July 8, 1949, now Pat. No. 2,636,851, issued April 28, 1953.

The ion exchange resins and ion exchange gels are particularly desirable as the ion-permeable solids in that they are selectively permeable as well as highly conductive. The mobile ions electrostatically retained within their polymeric structures are replaceable by ions of like charge as by the familiar ion exchange process, and under the influence of an electric field such ions of like charge will permeate the material and conduct an electric current through it. Under ordinary potential differences the concentration of the fixed charged ion exchange groups in their polymeric structure is sufficient to decrease substantially the penetration of the material by ions of opposite charge from the exchangeable ions, particularly in dilute solutions. It will therefore be seen that greater current separation efficiencies may be realized through the use of these materials and of other materials which are both selectively permeable and highly conductive; they should, of course, be selected so that the ions to be separated carry a greater proportion of the current than they would under non-selective conditions. Where the ions to be separated are cations a cation exchange material may be used; and where the ions to be separated are anions an anion exchange material may be used. Little advantage however is gained by sacrificing conductivity to attain ionic selectivity since the gain in current efficiency becomes offset by power losses, and oftentimes non-selective solids having high conductivities are preferred.

From the foregoing it will be apparent that the currently preferred ion-permeable solids consist of either ion-exchange resins or ion-exchange gels. Where the solid regions are presented as a packing, e. g. granules, the ordinary commercial ion-exchange resins in granular or bead form may be used. Resins having an ion-exchange capacity in excess of $10^{-2}$ milliequivalents per gram of material calculated on the weight of the dry material after drying to constant weight at 105° C., and containing 15 to 400 per cent water, calculated on the same basis, have been found to possess the desired conductivity and hydraulic resistivity. Where the solid regions or partitions comprise membranes or other large dimensional structures, they may be formed of ion-exchange gels as disclosed in the above identified application. Gels having an exchange capacity in excess of $10^{-2}$ milliequivalents per gram and containing from 15 to 400 per cent water (both figures being calculated on the weight of gel after drying to constant weight at

---

[2] Described below—see Example 5.
[3] Described by Marsh and Wood, An Introduction to the Chemistry of Cellulose (D. Van Nostrand, 1942).

105° C.) are desirably conductive and hydraulically impermeable.

It is to be understood that the properties of perm-selectivity, hydraulic resistivity and electrical conductivity are not properties inherent in any given ion-permeable solid material, but rather they are properties of such materials in particular electrolytic systems. Accordingly they exist as standards of performance which may be advantageously used to evaluate the relative merits of different ion-permeable solids, which are desirably differentially permeable. Attainment of these properties is by no means essential to this invention and considerable variations from them are often tolerable, the permissible variation being dependent in part on the degree of separation to be effected, the conductivity of the solution and also on economic considerations. The essential criterion of an effective ion-permeable solid is that it be differentially permeable to the species to be separated.

Appropriate apparatus for carrying out the process of this invention should provide intermixed solid ion-permeable regions and electrolytic solution containing regions, the latter regions being in such communication that flow of reflux may be maintained. Several representative forms of apparatus are described below and shown in the accompanying drawings in which.

Figure 3:
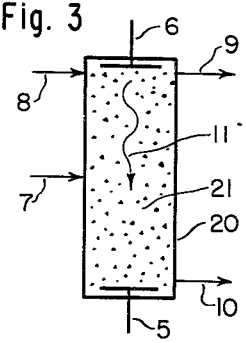
Figure 4A:
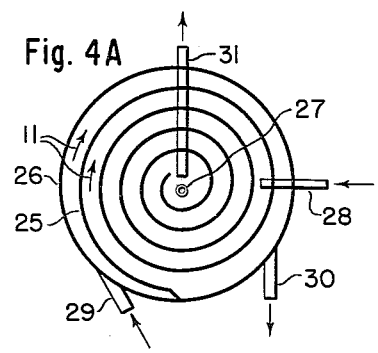
Figure 5:
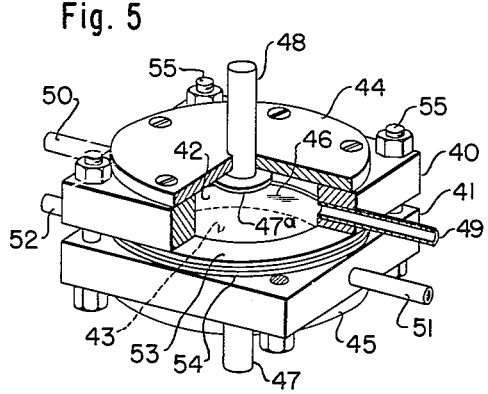
Figure 4B:
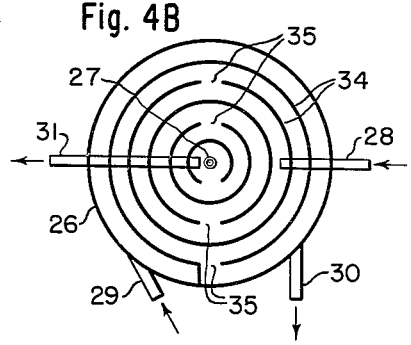

Fig. 3 is a schematic elevation of a packed column apparatus for effecting multiple stage separation, Figs. 4A and 4B are schematic plan views of different modifications of another type of apparatus for effecting separation, Fig. 5 is a perspective view of a simple separating cell showing portions broken away to reveal structural details, Fig. 6 is an oblique bottom view of the headers and feed spacer of a multiple stage separating apparatus showing the structural elements in exploded relation, Fig. 7 is an oblique bottom view showing, in exploded relation, the membranes and spacer comprising one cell of the apparatus of Fig. 6, and Fig. 8 is a cross section elevation of a packed column apparatus for carrying out the process of this invention.

Figure 1:
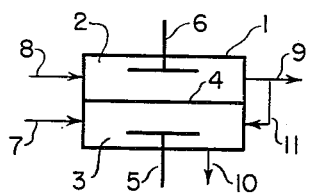
Fig. 1 is schematic elevation of a single stage separation system.

An elementary form of apparatus is shown schematically in Fig. 1. A container 1 is divided into two chambers 2 and 3 by an ion permeable membrane 4. An electrode 5 and 6 is provided in each chamber 2 and 3. Feed solution 7 containing the mixture of ionic species is fed continuously into the lower chamber 3 while a separate liquid 8 is fed continuously into the upper chamber 2 to provide for the maintenance of electrolytic conditions in that chamber. The ionic species to be separated are caused to migrate from the lower chamber 3 to the upper chamber 2 by means of an electric current introduced through the electrodes 5 and 6. The solution in the upper chamber 2 is withdrawn and a portion is introduced as reflux 11 into the lower chamber 3 while the remainder is removed as product 9. Product 10 is withdrawn from the lower chamber 3.

Figure 2:
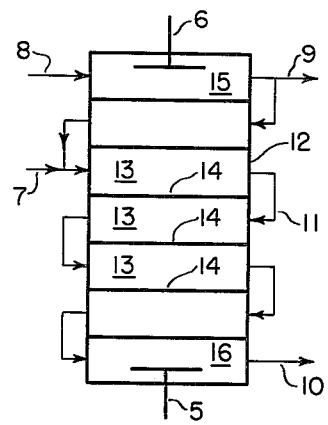
Fig. 2 is a schematic elevation of a multiple stage separation system.

If the ionic species in the feed solution 7 be designated M and N and it be assumed that they are both cations with M having the higher transport mobility it will be seen that by making the lower chamber 3 anodic and the upper chamber 2 cathodic both species will be caused to migrate into the cathode chamber 2. The product 9 withdrawn therefrom will be relatively enriched in species M and the product 10 withdrawn from the anodic chamber will be relatively enriched in species N. The rate of reflux and the current passed may be regulated to control, within limits, the degree of separation attainable, the reflux enhancing the separation over that achieved merely by causing the ionic species to migrate into the cathode chamber without reflux.

Where a greater degree of separation is desired than is attainable in the single membrane cell of Fig. 1, several chambers, separated from adjacent ones by membranes of ion-permeable material, and connected in hydraulic series may be used. For instance, as shown in Fig. 2, such an apparatus may consist of a column 12 formed of an insulating material, divided into several chambers 13 by membranes 14 of the appropriate ion-permeable material extending across it. The compartments are connected in hydraulic series in order that a flow of reflux 11 may be maintained. The terminal chambers 15 and 16 contain the electrodes 5 and 6.

Feed solution 7 containing the mixture of ionic species is introduced into one of the chambers 13 while those chambers hydraulically upstream are provided with a flow of liquid by the introduction of a liquid 8 into the uppermost chamber 15. The liquid 8 is provided to maintain electrolytic solution conditions in the upper chambers as well as to provide reflux for them. Ordinarily this liquid is the solvent of the feed solution, but it is only necessary that it be capable of forming ionic solutions with the ions present, more particularly with the ionic species which are to be separated. If desired the feed solution 7 may be introduced into the top chamber 15, in which case no separate liquid need be provided therein. An electrolytic current is caused to flow through the column between the electrodes 5 and 6 in series alternately through the solution in the chambers 13 and the membrane partitions 14 in the direction necessary to cause the upstream migration of the species to be separated.

The rate of reflux 11 relative to the upstream ionic current must be controlled within limits to cause a general downward progressive enrichment with respect to at least one species of ions while allowing a general upward progressive enrichment with respect to those species having higher transport mobilities. Product 9 enriched in species having relatively high transport mobilities may be withdrawn from the top chamber 15 and product 10 enriched in species having relatively low transport mobilities may be withdrawn from the bottom chamber 16. The rates of withdrawing product 9 and adding liquid 8 controls the rate of reflux in the upper portion of the column. In the lower portion below the feed point, the rate of adding the feed 7 is superimposed on the reflux rate in the upper portion.

In this apparatus an ordered system is provided. All the liquid and solid regions are in substantially complete electrical series with a negligible proportion of the current being carried by the reflux streams which bypass the membranes. (Even this negligible current in the reflux stream can be eliminated, for instance by feeding the reflux dropwise from chamber to chamber.) The liquid regions are in hydraulic series. Separation proceeds by definite steps, from chamber to chamber, efficiently and with a minimum of intermixing of enriched liquid with depleted liquid. Under steady operating conditions an equilibrium state is reached characterized by a definite relative concentration of each ionic species in each chamber.

Another apparatus for effecting a high degree of separation continuously consists of a column packed with an appropriate solid ion-permeable material, as shown schematically in Fig. 3. A column 20 of an insulating fabricating material is filled with a packing 21 of an ion-permeable solid material. Electrodes 5 and 6 are provided at the top and bottom of the column.

Feed solution 7 containing the mixture of ionic species is introduced into a mid-region or at the top of the column, while that portion of the column hydraulically upstream from the feed point is provided with a flow of liquid, including the reflux by the introduction of a liquid 8 at the top of the column. Percolation of liquid through the packing constitutes the reflux 11. An electric current is caused to flow through the column between the electrodes 5 and 6 in the direction to cause the ionic species to be separated to migrate up countercurrent the flow of the reflux 11.

The rate of reflux is controlled and the products withdrawn from the top and bottom of the column as described above with respect to the column of Fig. 2. In this embodiment of this invention the liquid-containing chambers corresponding to the chambers 13 of Fig. 2 consist of the interstitial spaces between the particles of packing, and the reflux 11 is provided by the percolation of liquid downward through the packing. It will thus be apparent that the apparatus of Fig. 3, just described, provides a separation mechanism identical with that of Fig. 2. In each case the ions to be separated are caused to flow upward through the solid ion-permeable regions or partitions by means of an electrolytic current supplied through the electrodes. The ions pass successively through liquid and solid ion-permeable regions while a general downward flow of liquid is maintained through the liquid regions at a rate controlled and limited to effect the desired separation.

The packed column apparatus of Fig. 3 differs in operation in some respects from the spaced membrane apparatus of Fig. 2. The packed column presents a more or less random distribution of solid and liquid regions which are incompletely in electrical series. The liquid regions are in incomplete hydraulic series. The refluxing liquid provides electrical circuits which parallel the circuits through the particles of ion-permeable solids and the liquid reflux flows only generally from enriched regions to depleted regions. In any cross section of the column any electrical or hydraulic path is duplicated by many parallel electric paths which are neither identical with nor separate from one another. Inefficiencies of separation may accordingly be introduced by the intermixing of liquids having varying degrees of enrichment and by the non-uniform flow of current and liquid through the column. The packed column however has a number of advantages. Not only is it inexpensive and easy to construct and maintain, but also its power consumption is often very low.

Another form of apparatus for carrying out essentially the same separation process is shown in Fig. 4A. A cell having a spirally wound membrane 25 of appropriate ion-permeable material is constructed having an inner central electrode 27 and an outer electrode 26 concentric with it and surrounding the spiral membrane, and enclosing the cell. Four ducts, 28, 29, 30 and 31, communicate with various parts of the spiral channel defined by the membrane 25, and provide for the introduction of feed (duct 28) and reflux liquid (duct 29) and for the withdrawal of products (ducts 30 and 31). The ions to be separated are caused to pass radially between the electrodes 26 and 27 passing through successive layers of solution and membrane while the liquid moves spirally in a composite direction opposite to the migration of the ions. That is, if the ions to be separated pass toward the outer electrode 26, the liquid is caused to move spirally inwardly as indicated by arrows 11. Feed may be introduced at any appropriate point in the spiral or at one of the electrodes, duct 28 being provided for this purpose. Reflux liquid is shown as introduced at the outer electrode through duct 29 but may be introduced at either electrode. Product solutions are withdrawn at the electrodes through ducts 30 and 31. This apparatus is preferably operated so that the external electrode is in contact with the least conductive portion of liquid. In this way advantage may be taken of the relatively low current density of the external electrode.

As shown, with the reflux introduced at the outer electrode 26, the current should be conducted between the electrodes 26 and 27 in the direction required to cause the ionic species to be separated to flow radially outward. The operating conditions, as rate of reflux and rate of product withdrawal are controlled as explained above to effect the desired separation. It will be seen that the reflux flows spirally, inwardly in the composite direction opposite that of the ionic migration.

A modification of the above described apparatus is shown in Fig. 4B. In that apparatus the spirally wound membrane 25 of Fig. 4A is replaced with concentric circular membranes 34 provided with passageways 35 allowing for the requisite composite outward or inward flow. The passageways may be in the membranes themselves preferably at diametrically opposite positions for adjacent membranes (as shown) resulting in circumferential flow between and past the membrane, or in headers at the columnar ends of the membranes 34 which provide axial flow between and past the membranes. Feed and reflux are introduced and product withdrawn as explained above with reference to Fig. 4A.

It will be seen that all of the above described apparatuses provide for the migration of ionic species of like charge, either anions or cations, in one direction through interspersed solid ion-permeable regions and liquid containing regions and for the flow of fluid in the composite opposite direction. Where reference herein has been made to upper, lower, top, bottom and similar terms, it will be understood that they refer particularly to the hydraulic relationship of things and not particularly to their vertical relationship. The degree and nature of any separation depends in part on the rate of reflux, current, size of column and/or number of separating units, on the particular ion-permeable solid material and on the ionic species present.

Although the above description mentions the withdrawal of products from the top and bottom of the fluid flow path, it may often be desirable to withdraw product also from the intermediate points along the flow path. Such a technique would have special utility in multicomponent systems, where more than two fractions of product are desired. Any of the product streams from one separator may, of course, be made the feed of another separator, wherein one or more of the ionic species present in it is removed, and one or more of the product streams from such other separator may, if desired, be recycled back to the first separator. If desired, several separators may be combined in a single shell.

It may often also be advantageous to introduce feed at either the top or bottom of the flow path instead of into a mid-region in order to remove remnants of species having high transport mobilities (if feed is introduced at the top) or to remove remnants of species having low transport mobilities (if feed is introduced at the bottom).

A batch separation (non-continuous) may also be effected by filling a column or separator with the solution containing the ionic species, introducing the reflux and removing the product from the top, and removing only pure solvent from the bottom. The removal of pure solvent may be effected by withdrawing product from the bottom, distilling off the solvent, and returning concentrated product back to the bottom of the separator. Successive fractions may be withdrawn from the top, each fraction predominating in one species according to its transport mobility.

The process of this invention has been determined to lend itself to a mathematical analysis analogous to the classical analysis of vapor fractionation. The reference herein to reflux suggests the analogy, and it can be extended by relating the vapor in the fractionating column to the ionic flow of the process of this invention, and the heat source and condenser to the potential applied across the column. Equations remarkably similar to the familiar distillation equations can be developed from which theoretical standards can be formulated, such as minimum reflux, theoretical number of plates and degree of separation attainable.

For instance, the classical graphical analytical method of McCabe and Thiele,[4] may be applied to the separation of two-components, by the process of this invention. The equations for the operating lines become:

$$y_n = \frac{O_{n+1}}{I_n}x_{n+1} + \frac{Dx_c}{I_n}$$

and $$y_m = \frac{O_{m+1}}{I_m}x_{m+1} - \frac{Wx_w}{I_m}$$

where:

$y$ and $x$ are as defined above, and refer to the species having the higher transport mobility.
$O$=number of equivalents of ions of like charge passing down the column in the reflux stream per second.
$I$=ionic current passing up the column from stage to stage (due to ions of like charge) as equivalents per second.
$D$=number of equivalents of ions of like charge removed from the top of the column per second.
$W$=number of equivalents of ions of like charge removed from the bottom of the column per second.

Subscripts:

$n$ refers to plates above feed.
$m$ refers to plates below feed.
$c$ refers to the top product.
$w$ refers to the bottom product.

The equilibrium line may be plotted from the equation $$\frac{y}{1-y} = \alpha\frac{x}{1-x}$$

$\alpha$ having been determined by measurement.

The practice of the process of this invention may oftentimes require a preliminary determination of the suitability (or relative suitability) of particular ion-permeable solid material. The suitability of a membrane may be determined readily in a simple cell which is divided into anode and cathode chambers by a membrane. The determination involves the introduction of a solution containing the ionic species into one of the chambers and the passage of an electric current to cause them to migrate into the other chamber. An analysis of the donee solution in the latter chamber reveals the degree and nature of the separation attainable in that membrane. The separation factor (or the ratio of transport mobilities) may be calculated which can be applied to the design of apparatus for carrying out the process of this invention in much the same way separation factors determined from vapor-liquid equilibrium measurements are applied to the design of vapor fractionating columns. For ion-permeable granular packing material a similar technique may be used to determine the dimensions of a packed column having the separating effect of a single membrane.

Apparatus which may be used to determine the suitability of a membrane is shown in Fig. 5.

Two headers 40 and 41 of insulating fabricating material, each provided with a central chamber 42 and 43, conveniently a hole bored through the headers and covered on one side with a closure 44 and 45. Two ports 49—50 and 51—52 communicate with each chamber 42 and 43 and terminate at their outer ends in tubular extensions to which hydraulic coupling may be made. Bus members 47 and 48 extend through the closures 44 and 45 and support the electrodes 47a within the chambers 42 and 43. The membrane 46 of suitable ion-permeable material is held between rubber rings 53 and 54 between the headers 40 and 41 and separates the chambers 42 and 43 hydraulically. The entire assembly is held together in tight compressional relationship by means of four bolts 55 situated more or less evenly about the chambers. Electrolytic solutions may be introduced or circulated into or through the chambers through the ports 49, 50, 51 and 52. (If desired the reflux conditions suggested by Fig. 2 may be realized by connecting one of the ports of one header with one of the ports of the other header, and providing in the connecting member an opening or port through which a fraction of the reflux may be removed as enriched product, as shown schematically in Fig. 2.)

In the following two examples a simple single step partial separation of ionic species is practiced in the above described apparatus of Figure 5.

Example 1

A membrane selectively permeable to cations was prepared as follows:

|  | Parts by weight |
|---|---|
| Phenol sulfonic acid, 65% in water | 50 |
| Formaldehyde, 35.4% in water | 24.7 |

The acid is added slowly to the formaldehyde while the temperature of the mixture is maintained at 0° C. Thereafter the mixture, at a temperature below 5° C., is poured into a mold containing a flat 12 x 12 mesh 15 mil woven Saran (polyvinylidene chloride) screen to form a sheet or disk 0.08 cm. thick, and cured at 85° C. in a closed system substantially saturated with water vapor. The curing requires about three hours. The membrane was assembled in the apparatus shown in Fig. 5, flanked by two rubber rings each 0.1 cm. thick.

The two central chambers were each 2.0 cm. deep and 6.5 cm. in diameter. The electrodes consisted of silver gauze having an electrolytic deposit of silver chloride; their effective areas were 28 cm.² Prior to assembly the membrane was brought into equilibrium with an aqueous solution 0.05 N in KCl and 0.05 N in NaCl.

Both compartments were first filled with an aqueous solution 0.05 N in KCl and 0.05 N in NaCl. A current of 0.04 amperes was passed through the cell, the upper compartment of Fig. 2 being cathodic. Water was introduced into the upper (cathodic) compartment at a rate of 0.25 cc. per minute, and makeup aqueous feed solution 0.05 N in KCl and 0.05 N in NaCl was introduced into the lower (anode) compartment at the rate of 15 cc. per minute. After 320 minutes the potential required to pass 0.040 amperes was 0.15 volt. An analysis of the effluent from the upper (cathodic) compartment showed that .00472 equivalent of potassium and .00313 equivalent of sodium had permeated the membrane. The cathodic solution will thus be seen to have been enriched with respect to potassium. The membrane used herein is effective to separate potassium and sodium ions, the separation factor being 1.5.

A similar separation of sulfate and nitrate is shown in the following example.

Example 2

Apparatus similar to that used in Example 1 was used. The membrane was prepared as follows:

|  | Parts by weight |
|---|---|
| Resorcinol USP | 11 |
| Pyrogallol | 12.6 |
| Guanidine hydrochloride | 19.1 |
| Aqueous formaldehyde USP (37%) | 32 |
| Metaformaldehyde | 9.1 |

The formaldehyde, metaformaldehyde and guanidine are mixed in these proportions and heated to 75° C. The pH of this solution is adjusted to 8.0 with 1 N sodium hydroxide and the pyrogallol and resorcinol are added with stirring. The solution is heated to 95° C. cooled immediately to 30° C. and poured at this temperature into a mold containing cotton gauze to form cast disks 0.08 cm. thick. The curing is carried out at 60–85° C. over

---

[4] See e. g. Walker, Lewis, McAdams and Gilliland, Principles of Chemical Engineering (3rd ed., McGraw-Hill, 1937), pages 553 et seq. esp. pp. 558 to 562.

a five hour period in a closed system in the presence of a saturated atmosphere of water vapor. The disks were removed from the molds and repeatedly soaked in excesses of 0.5 N sodium chloride solution. The electrodes were copper disks 5.6 cm. in diameter. Prior to assembly the membrane was brought into equilibrium with an aqueous solution 0.0481 N in copper sulfate and 0.0539 N in copper nitrate.

The compartments were first filled with an aqueous solution 0.0539 N in copper nitrate and 0.0480 N in copper sulfate. A current of 0.040 ampere was passed between the compartments, the upper compartment being anodic. An aqueous feed solution of the same composition was introduced into the lower (cathode) compartment at a rate of 5 cc. per minute. After 150 minutes the potential required to pass 0.040 ampere was 0.45 volt. Analysis of effluent from the upper (anodic) compartment showed that 1.74 milliequivalents of nitrate and 1.22 milliequivalents of sulfate had passed into the anodic compartment resulting in a relative enrichment of the solution therein with respect to nitrate. The separation factor was found to be 1.3.

The above examples demonstrate the basic separation mechanism utilized in the process of this invention. Data determined from single step separations such as those may be utilized to design and operate the multiple step continuous separation apparatus in which the ions are transfered from liquid region to liquid region through solid ion-permeable solid regions while reflux liquid flows countercurrently through the liquid regions. These data include separation constants, transport mobility, current efficiency, and relative transport number.

It will be seen that in these examples the feed solution is renewed at a relatively high rate. This tends to maintain a constant concentration in the feed solution in the chamber and facilitates the calculation of the separation factor which is equivalent to the quotient of the ratio of the increases in the concentrations of the ions in the donee solution and the ratio of the concentration of the ions in the donor (feed) solution, the concentrations being expressed in equivalents. Other relevant data may also be determined in the apparatus used above. They include specific conductance, hydraulic resistivity and selective permeability.

The following examples are representative of multiple stage separations of ionic species by means of the process of this invention.

In Examples 3 and 4 the solid ion-permeable regions consist of partitions formed from membranes of the appropriate materials, for instance membranes made in accordance with the processes described in Examples 1 and 2. The membranes with spacers defining chambers between them are assembled between headers containing electrode chambers and form a column of chambers. If feed is to be introduced in a mid-chamber (any chamber other than the electrode chambers) a feed spacer is included in the midst of the array of membranes through which the feed solution may be introduced. The precise location of feed spacer depends on how many chambers are desired above and below the feed point. In accordance with standard vapor fractionation terminology, the analogy of this process to which has been mentioned, the column above the feed point is referred to as the enriching section and that below the feed point as the stripping section.

The apparatus is shown in Figs. 6 and 7. The headers 60 and 61 consist of flat blocks of insulating fabricating material, each provided with a central chamber 63 and 64, conveniently a circular recess bored into a face of each header 60 and 61. Each chamber 63 and 64 contains an electrode 65 and 66 of appropriate material held therein by busses 67 and 68 to which the electrodes 65 and 66 are fastened. The busses 67 and 68 extend through the end walls of the headers 60 and 61 in order that electrical connection can be made to them. A pair of ducts 69—70 and 71—72 which terminate at their outer ends in tubular extensions to which hydraulic coupling may be made, are provided in each header 60 and 61 and communicate with the electrode chambers 63 and 64. Outward from each chamber extends a short channel 73 whose function will appear presently.

The feed spacer 62 consists of a flat block of insulating fabricating material having an internal opening extending through it thereby defining the feed chamber 74. Flat baffles 75 extend into the feed chamber 74 to distribute liquid flowing through it and to support the membranes placed on each side of it. A pair of channels 76 and 77 extend outwardly from the feed chamber 74 and also extend through the width of the feed spacer 62. A duct 78 terminating at its outer end in a tubular extension to which hydraulic coupling can be made extends laterally into the feed spacer 62 and communicates with the feed chamber 74 defined therein. Gaskets 79, 80, 81 and 82 having the appropriate configuration (determined by the shape of the member they fit against) are provided to prevent leakage from the electrode and feed chambers. They are conveniently made from rubber sheet material. The gaskets 79 and 80 situated adjacent each header 60 and 61 each contains a port 83 and 84 which overlies the channels 73 provided in the headers 60 and 61.

The desired number of membranes with spacers separating them are held between each header and the feed spacer as indicated at A and B to form the enriching and stripping section. The spacers are conveniently formed from rubber sheet material. A pair of membranes 90 and 91 separated by a spacer 92 defining a single chamber 95 are shown in Fig. 7. The membranes 90 and 91 each have a port 93 and 94 extending through them near their edges. The ports 93 and 94 are situated so that when the membranes 90 and 91 are assembled as at A between the gaskets 79 and 81, the port 93 of membrane 90 overlies the port 83 of gasket 79 and the port 94 of the membrane 91 overlies one of the channels 85 of the gasket 81 corresponding to one of the channels 76 and 77 of the feed spacer 62. The spacer 92 has a cut-out central region which defines the chamber 95 between the membranes. Channels 97 and 98 extend outwardly from the chamber 95 and are situated so that one of them communicates with the port 93 of the membrane 90 and the other communicates with the port 94 of the membrane 91. Baffles 96 extend into the chamber 95 and distribute the flow of liquid therethrough and also support the mid-regions of the membranes. It will thus be seen that when the membranes 90 and 91 and spacer 92 shown in Fig. 7 are assembled at A in Fig. 6 there is provided a series hydraulic circuit from the electrode chamber 63 of the header 60 to the feed chamber 74, the itinerary being channel 73, port 83, port 93, channel 97, chamber 95, channel 98, port 94 and channel 76. A similar arrangement of membranes and spacers assembled between gasket 82 and the gasket 80, as indicated at B will be seen to provide a similar series circuit between feed chamber 74 and the electrode chamber 64 of the bottom header 61. It will be understood that the above description is of a unit having but one enriching chamber and one stripping chamber and that more of either may be provided simply by adding additional membranes and spacers at A and/or B, making whatever obvious modifications are necessary to provide a series hydraulic circuit throughout. The entire assembly is conveniently held together in tight compressional relationship by means of the four bolts 87 which extend through the headers and feed spacers exterior of the chambers.

The following examples demonstrate the operation of the above-described apparatus of Figure 6 in practicing one embodiment of the process of this invention.

*Example 3*

The enriching section A and stripping section B each consisted of three membranes 0.08 cm. thick produced in accordance with Example 1 and two rubber spacers 0.08 cm. thick. The effective areas of membrane surface exposed by the center portion of the spacers were 25 square centimeters. The electrode chambers were each 6.5 cm. in diameter and had a volume of 50 cubic centimeters. The feed chamber exposed 25 square centimeters of membrane at either side and was 0.5 cm. thick. The anode consisted of silver gauze and the cathode consisted of silver gauze having on its surface an electrolytic deposit of 4.0 ampere hours of silver chloride. Each electrode had an exposed surface of 28 square centimeters. The anode was mounted to the bus in the lower electrode chamber and the cathode was mounted to the bus in the upper electrode chamber. Before assembling the apparatus the membranes were brought to equilibrium with an aqueous solution 0.0510 N in KCl and 0.0493 N in NaCl. Suitable electrical connections were made and the chambers were filled with a solution 0.0510 N in KCl and 0.0493 N in NaCl. A current of 0.063 ampere was passed.

Feed consisting of an aqueous solution 0.05 N KCl and 0.05 N in NaCl was fed into the feed chamber at the rate of 0.111 cc./min. Distilled water at the rate of 0.358 cc./min. was introduced into the cathode (upper) chamber through one of the ducts. Effluent was withdrawn through one of the ducts from the lower (anode) chamber at the rate of 0.373 cc./min. and the remainder was withdrawn from the cathode chamber. (Calculated at .096 cc./min.) (It will be seen that one of the ducts of the anode chamber is not used and should be plugged.)

After 1200 minutes a steady state was reached. The potential required to pass 0.063 ampere was 11 volts. The effluent from the cathode chamber was analyzed and found to contain 0.0464 milliequivalent of KCl per cc. and 0.0170 milliequivalent of NaCl per cc. the effluent from the anode chamber contained .0028 milliequivalent of KCl per cc. and .0088 milliequivalent NaCl per cc. It will be seen that an effective separation has been accomplished, the effluent from the cathode chamber having been enriched with respect to potassium and the effluent from the anode chamber having been enriched with respect to sodium. The provision of reversible electrodes, silver-silver chloride in a chloride solution, minimizes contamination dangers from electrode reaction products and minimizes the electrode voltage requirements.

Example 4

In this example the apparatus of Figs. 6 and 7 is operated as a stripping section. The feed spacer and its flanking gaskets were not used; the feed was introduced into the upper electrode chamber of the header. Six membranes separated by five spacers, both identical to the membranes and spacers used in the preceding example, were assembled between the headers after first bringing the membranes to equilibrium with an aqueous solution 0.0993 N in $CaCl_2$ and 0.0997 N in NaCl. Silver and silver chloride electrodes were again used, the silver chloride electrode comprising the cathode in the upper electrode chamber.

The chambers were filled with an aqueous solution 0.0993 N in $CaCl_2$ and 0.0997 N in NaCl. A current of 0.200 ampere was passsed through the chambers and membranes. Aqueous feed solution 0.0993 N in $CaCl_2$ and 0.0997 N in NaCl was introduced into the cathode chamber at the rate of 0.49 cc./min. Effluent at the rate of 0.10 cc./min. was withdrawn from the cathode chamber and effluent at the rate of 0.39 cc./min. was withdrawn from the lower anode chamber.

After 1100 minutes of operation a steady state was reached. The potential required to pass the 0.200 ampere was 2.0 volts. The effluent from the cathode chamber was analyzed and found to contain 0.195 milliequivalent of $CaCl_2$ per cc. and 0.170 milliequivalent of NaCl per cc. The effluent from the lower anode chamber contained 0.054 milliequivalent of $CaCl_2$ per cubic centimeter and 0.068 milliequivalent of NaCl per cubic centimeter. It will be observed that calcium is the more mobile cation and the effluent from the cathode chamber was accordingly enriched with respect to it while the effluent from the anode chamber was enriched with respect to sodium.

The following example demonstrates the process of this invention wherein membranes which are not selectively permeable are used.

Example 5

An apparatus identical to that used in Example 3 was assembled using, however, six solid polyvinyl alcohol diaphragms, three in the enriching and three in the stripping sections. A cathode of silver-silver chloride having plated on it 0.75 ampere hours of silver chloride was placed in the upper chamber. The anode was silver. The diaphragms each had a thickness of 0.15 cm. A feed containing 0.098 milliequivalent per cubic centimeter of chloride, 0.051 milliequivalent per cubic centimeter of sodium and 0.047 milliequivalent per cubic centimeter of potassium (by difference) was fed at the rate of 0.50 cc./min. into the feed compartment. Distilled water at 1.0 cc./min. was passed into the cathode compartment and 0.96 cc./min. of product withdrawn from the anode compartment, the remainder (0.54 cc./min.) being allowed to flow out of the cathode compartment. A current of 100 milliamperes was passed through the apparatus. After 3 hours of operation a steady state had been reached in which the cathode product contained 0.0283 milliequivalent per cubic centimeter of chloride, 0.0099 milliequivalent per cubic centimeter of sodium and 0.0184 milliequivalent per cubic centimeter of potassium (by difference). The anode product contained 0.0340 meq./cc. of chloride, 0.0201 meq./cc. of sodium, and 0.0139 meq./cc. of potassium (by difference). The current efficiency was 45% and the voltage required was 9 volts.

The polyvinyl alcohol membranes were made by conventional film casting techniques. A 5% solution of commercial polyvinyl alcohol normally containing about 1 mol per cent of ketonic carbonyl substituted for hydroxyl was evaporated in a cylindrical mold to give a film. The film was then saturated with 6 N hydrochloric acid and heated at 80° C. for 30 minutes, and subsequently washed free of acid. The resulting membranes had a thickness of 0.15 cm., a water content of about 1 gram per gram of material dried to constant weight at 105° C. (The small amount of carbonyl groups has been found necessary for cross-linking as shown by J. T. Clarke and E. R. Blout, Journal of Polymer Science 1, 419 (1946).)

In Example 6 below a multiple step continuous separation is effected in a cylindrical column containing a packing of ion-permeable solid material in granular form. The apparatus is shown in Fig. 8. It consists of an upper enriching section 100 and a lower depleting section 101 with a feed section 107 between them and electrode-header chambers 109 and 110 at their outer ends, all of said sections being in columnar arrangement and closed at the ends by the electrode plates 118 and 119. Each section conveniently consists of a cylindrical chamber formed in and through an appropriately shaped block of the insulating fabricating material. The enriching section 100 and the depleting section 101 are each filled with the desired packing 102 of ion-permeable material. A screen 103, 104, 105 and 106 which is conveniently a fine mesh glass fabric, covers each end of the enriching and depleting sections 100 and 101 and retains the packing 102 therein. A feed duct 108 enters and communicates with the feed section 107. Four ducts 111, 112 and 113 and one not shown enter and communicate with the upper header section 109 and three ducts 115, 116 and 117 enter and communicate with the lower header section 110. These ducts all terminate at their outer ends in tubular extensions to which hydraulic coupling may be made.

The electrode plates 118 and 119 close the ends of the column. Supported on the inner side of each of them is an electrode 120 and 121. A bus 122 and 123 extends through each of the plates 118 and 119 and connects with each electrode 120 and 121.

The electrode-header sections 109 and 110 are conveniently cemented respectively to the enriching section 100 and the depleting section 101, with the screens 103 and 106 between them. Similarly the screens 104 and 105 are conveniently cemented across the open ends of the feed section 107. The column is held in tight compressional unison by appropriate means, conveniently by bolts such as those shown in Fig. 6. The electrode plates 118 and 119 are separately secured (such as by means of separate nuts engaging the bolts, recesses being provided in the plates 118 and 119 to accommodate nuts holding the rest of the column) so as to be separately removable without disassembling the entire column.

The packing is preferably granular ion-exchange resin, although ion-permeable packing comprising hard, non-compactable, electrolytic containing gels are suitable. Ion-exchange resins have the advantage of being selectively permeable to either anion or cations. Preferably the packing is in the form of beads which give somewhat better hydraulic flow patterns than do irregularly shaped granules. Suitable materials include the synthetic organic commercial ion-exchange resins, several of which are listed in Kunin & Myers, Ion Exchange (Wiley & Sons, 1950) p. 58, Table 7. Suitable granular packing of cation exchange resins may be made in accordance with the teaching of Gaetano F. D'Alelio, Patent 2,366,007 and William C. Bauman, Patent 2,466,675.

The following example demonstrates the operation of the above described apparatus of Figure 8 in practicing one embodiment of the process of this invention.

*Example 6*

The enriching and stripping sections were each 2.5 inches in diameter and 1.0 inch long. The electrode header sections were ¼ inch wide and the feed section was 5/16 inch wide. The electrodes consisted of circular silver sheets of 2⅜ inches in diameter cemented to the electrode plates. The enriching and stripping sections were filled with 20–100 mesh beads of a sulfonated polystyrene cation exchange resin having a total exchange capacity of 4.25 meq./gram (the commercial product is believed to be made in accordance with the teachings of the above identified patents of D'Alelio and Bauman),[5] the resin having first been equilibrated with an aqueous solution 0.984 N in chloride, 0.048 N in sodium (as sodium chloride) and 0.050 N in potassium (as potassium chloride). Each section received about 80 cc. of resin. The cathode was plated with 1.5 ampere hours of silver chloride and was assembled at the top of the enriching section. The anode was plated with 0.3 ampere hour of silver chloride and assembled at the bottom of the stripping section.

The apparatus was filled with an aqueous solution 0.0984 N in chloride, 0.048 N in sodium and 0.050 N in potassium and a similar solution formed the feed which was introduced into the feed section at a rate of 1.5 cc. per minute. Distilled water at the rate of 7.5 cc. per minute was fed into the upper (cathodic) electrode header section. Product was withdrawn from the lower (anodic) electrode header at a rate of 6.0 cc. per minute, and the rest of the liquid input was allowed to overflow from the upper electrode chamber as top product. The two remaining ducts in each electrode header were used to circulate the liquid through the respective header sections at the rate of 33 cc. per minute thereby providing a stirring action in each of said sections. A current of 0.150 ampere was passed through the column through the busses provided at the ends.

Every eight hours the electrodes were changed. All hydraulic flow and the electric current was stopped and the anode end plate was removed and replaced by an auxiliary electrode end plate similar to the anode end plate as first assembled. The cathode end plate was then removed and replaced by the old anode end plate. Changing the electrodes was necessary because during operation silver chloride is removed from the cathode and deposited on the anode. Replacing the cathode with the old anode provides a new cathode having a fresh deposit of silver chloride thereon.

After 400 hours a steady state was reached. The potential required to pass the 0.150 amperes was twelve volts. Analysis showed that the effluent from the upper (cathode) header was 0.0051 N in potassium and 0.0035 N in sodium. And the effluent from the bottom (anode) header was 0.0091 N in potassium and 0.0107 N in sodium. It will thus be seen that an effective separation has been accomplished and that product enriched in the more mobile species of ions (potassium) is withdrawn from the top cathode chamber while product enriched in the less mobile species of ions (sodium) is withdrawn from the bottom anode chamber.

From the foregoing it will be apparent that the process of this invention affords an economical and efficient means for separating ionic species having like charges. The examples herein are set forth as illustrative and representative and modifications of these processes may be embodied without deviating from the scope of this invention. For instance electric current need not be constant and invarient in magnitude and sign as it was in the examples. Only a net direct current component is required and advantages are often inherent in using an interrupted direct current or an alternating current superimposed on a direct current such as for example by passing a higher total direct current without causing "polarization" at the membranes, and also resulting in improved and more efficient operation of the electrodes.

The electrodes are preferably reversible and involve ions of charge opposite that of the ions to be separated. Reversible electrodes have the advantage of being non-gas forming and do not disturb the hydrogen ion concentration of the solutions in which they function. By selecting electrodes which collect or emit ions not undergoing separation, disturbance of the ion concentration conditions (with respect to the ions being separated) in the electrode chambers is avoided. However, it will be apparent that electrodes which are neither reversible nor active solely with ions not undergoing separation may be used, especially if they are contained in separate electrode chambers which are hydraulically insulated from the solutions containing the mixture of ionic species, while being in electrolytic contact with said solutions. Such conditions may be realized by separating the electrodes from the other solutions by means of ion-permeable membranes.

The use of aqueous solutions of the ionic mixture is preferred because of the high degree of dissociation of electrolytes therein, but the solvent can be any liquid in which the electrolytes are soluble and in which the ionic species to be separated are present as mobile ions. Moreover, the two liquids which are introduced into the column may differ as to solvent content, but preferably the solvents are miscible.

It is contemplated that the partial dependency of the separation factor on, and its variation with, the relative concentrations of the ionic species present in a solution may result in operating conditions wherein, after some separation has been attained, the separation factor becomes unity, making further separation impossible unless other conditions be changed. Such operating conditions would correspond to azeotropic conditions encountered in vapor fractionation. It is further contemplated that the separation factor of a particular system may be augmented or attenuated by changing the ionic concentration or by adding additional solutes which may or may not form complex ions with one or more of the ionic

---

[5] Dowex 50 is also described by W. C. Bauman and J. Eickhorn in the Journal of the American Chemical Society 69, 2830 (1947).

species present. These concepts are already highly developed in the field of vapor fractionation and the present indications, as set forth above, are that similar phenomena will be encountered in the processes of this invention. It will accordingly be understood that the occurrence of such phenomena do not effect a deviation from the scope of this invention.

Having thus disclosed our invention we claim:

1. In the method of separating ionic species of like charge in a system comprising two electrodes, at least one solid region therebetween, said solid region consisting of solid ion-permeable substantially hydraulically impermeable solvated gel material and defining thereby at least two liquid solution regions containing solutions having said ionic species in differing relative proportions, one of said solution regions being between one of said electrodes and said solid region, and the other of said solution regions between the other electrode and said solid region, the steps comprising: introducing a liquid electrolytic solution of said ionic species into said system, passing a direct electric current through said solution regions and said solid region to effect the migration of at least a portion of said ionic species from one of said solution regions through said solid region into another of said solution regions, withdrawing as a first product a solution from one of said solution regions, and withdrawing as a second product a solution from another of said solution regions, said product solutions containing said ionic species in differing relative proportions.

2. The method of claim 1 wherein the solvated gel material is selectively permeable to ions of the charge to be separated.

3. The method of claim 1 wherein the ionic species to be separated are anions and the solvated gel material is selectively permeable to anions.

4. The method of claim 1 wherein the ionic species to be separated are cations and the solvated gel material is selectively permeable to cations.

5. In the method of separating ionic species of like charge in a system comprising two electrodes, at least one solid region therebetween, said solid region consisting of solid ion-permeable substantially hydraulically impermeable solvated gel material and defining thereby at least two liquid solution regions containing solutions having said ionic species in differing relative proportions, one of said solution regions being between one of said electrodes and said solid region, and the other of said solution regions between the other electrode and said solid region, the steps comprising: introducing a liquid electrolytic solution of said ionic species into said system, passing a direct electric current through said solution regions and through said solid region to effect the migration of at least a portion of said ionic species from one of said solution regions through said solid region into another of said solution regions, passing at least a fraction of solution from one of said solution regions to another around said solid region in a composite resultant direction substantially opposite to the migration of said ionic species under the influence of said electric current, withdrawing as a first product a fraction of solution from one of said solution regions, and withdrawing as a second product a second fraction of solution from another of said solution regions, said product solutions containing said ionic species in differing relative proportions.

6. The method of claim 5 wherein the ion-permeable solvated gel material is selectively permeable to ions of the charge to be separated.

7. In the method of separating ionic species of like charge in a system comprising two electrodes, at least one solid region therebetween, said solid region consisting of a solid insoluble ion-permeable substantially hydraulically impermeable solvated gel material and defining thereby at least two liquid solution regions containing solutions having said ionic species in differing relative proportions, one of said solution regions being between one of said electrodes and solid region, and the other of said solution regions between the other electrode and said solid region, the steps comprising: introducing a first electrolytic solution of said ionic species into a first solution region and introducing a second liquid into the second solution region, passing a direct electric current through said first electrolytic solution through said ion-permeable solvated gel material into the second solution region thereby effecting a relative enrichment of the second solution region in the ionic species to which the solid gel material is most permeable, and withdrawing said solution from said second solution region as an ion-enriched product.

8. In a method of separating ionic species of like charge in a system comprising two electrodes, at least one barrier in the form of a membrane consisting of a solid ion-permeable substantially hydraulically impermeable solvated gel structure and defining thereby at least two liquid chambers between said electrodes containing solutions having said ionic species in differing relative proportions, the steps comprising: introducing a liquid solution of said ionic species into one of said chambers, passing a direct electric current through said chambers and membranes to effect migration of at least a portion of said ionic species from one chamber through said barrier to another chamber, passing a fraction of solution from at least one of said chambers to another around said membrane in a composite direction substantially opposite to the migration of said ionic species under the influence of said electric current, withdrawing as a first product a solution from one of said chambers, and withdrawing as a second product a solution from another of said chambers, said product solutions containing said ionic species in differing relative proportions.

9. The method of claim 8 wherein the membranes comprise insoluble synthetic organic polymers having ion-exchange groups which render the same selectively permeable to ions of the charge to be separated.

10. In a method for separating ionic species of like charge in a system comprising two electrodes, a plurality of chambers each separated by an ion permeable hydraulically impermeable membrane of a solvated gel structure, the steps comprising: introducing an electrolytic solution of said ionic species into one of said chambers and withdrawing a fraction of said electrolytic solution from said chamber to reflux the same in series into the adjacent chamber, and passing said fraction in series through the succeeding chambers around the separating succeeding membranes, passing a direct electric current through said chambers and membranes to effect migration of at least a portion of said ionic species from each chamber through the membrane to the adjacent chamber in a direction substantially opposite to the migration of said ionic species under the influence of said electric current, and withdrawing as a first product a fraction of solution from one of said chambers and withdrawing as a second product a solution from another of said chambers, said product solutions containing said ionic species in different relative proportions.

11. The method of claim 10 wherein the flow of said electrolytic solution through said system is in a direction adapted to effect relative upstream enrichment of each of said species having higher transport mobilities and to effect relative downstream enrichment with respect to species having lower transport mobilities, and withdrawing product streams from the chambers at approximate opposite ends of said system.

12. The method of separating ionic species of like charge in a system comprising two electrodes, a bed of granules of ion-permeable substantially hydraulically impermeable solvated gel material between said electrodes comprising: flowing an electrolytic solution of said ionic species through said bed of granules, passing a direct electric current through said solution and granules to effect migration of said ionic species in a direction opposite that of said solution flow, withdrawing separate fractions of said solution from at least two spaced points along the solution flow path, said fractions containing said ionic species in differing relative proportions.

13. The method of claim 12 wherein the granular solvated gel material is selectively permeable to ions of the charge to be separated.

14. In the method of separating ionic species of like charge in a system comprising two electrodes, a column of solids of ion-permeable hydraulically impermeable granules of a solvated gel material having void spaces therebetween defining a liquid flow path through said column comprising: introducing an electrolytic solution of said ionic species through said column, introducing a liquid to that portion of the column upstream from the point where said electrolytic solution is introduced and flowing said liquid concurrently with said electrolytic solution, passing a direct electric current through said column of granules and solution to effect the migration of said ionic species through said column in a direction opposite that of the solution flow, and withdrawing solution products from the approximate ends of said column.

15. The method of claim 14 wherein the solvated gel material is selectively permeable to ions of the charge to be separated.

References Cited in the file of this patent

UNITED STATES PATENTS

| | | |
|---|---|---|
| 2,251,082 | Theorell | July 29, 1941 |
| 2,341,356 | Briggs | Feb. 8, 1944 |
| 2,428,329 | Ham et al. | Sept. 30, 1947 |
| 2,566,308 | Brewer | Sept. 4, 1951 |

OTHER REFERENCES

"Helvetica Chimica Acta," vol. 23, pages 795 thru 800, paper by Myer et al.

Electrochemistry: Thompson (1925), rev. ed., page 176 cited.

"Industrial and Engineering Chemistry," vol. 25 (1933), pages 336–338, article by Bartow et al.

"Nature," vol. 165 (April 8, 1950), page 568, article by Kressman.